(12) United States Patent
Nam et al.

(10) Patent No.: US 7,388,920 B2
(45) Date of Patent: Jun. 17, 2008

(54) APPARATUS AND METHOD FOR PERFORMING CHANNEL ESTIMATION IN AN ORTHOGONAL FREQUENCY DIVISION MULTIPLEXING (OFDM) SYSTEM USING MULTIPLE ANTENNAS

(75) Inventors: Seung-Hoon Nam, Seoul (KR); Chung-Yong Lee, Seoul (KR); Myeong-Cheol Shin, Seoul (KR)

(73) Assignees: Samsung Electronics Co., Ltd. (KR); Yonsei University (KR)

( * ) Notice: Subject to any disclaimer, the term of this patent is extended or adjusted under 35 U.S.C. 154(b) by 688 days.

(21) Appl. No.: 10/726,118

(22) Filed: Dec. 2, 2003

(65) Prior Publication Data

US 2004/0218682 A1 Nov. 4, 2004

(30) Foreign Application Priority Data

May 2, 2003 (KR) .................... 10-2003-0028275

(51) Int. Cl.
*H04L 27/28* (2006.01)
*H04L 27/00* (2006.01)
*H04J 11/00* (2006.01)

(52) U.S. Cl. .................. 375/260; 375/299; 370/208
(58) Field of Classification Search ............ 375/367, 375/360, 347, 295, 299, 259, 260, 267, 219, 375/130, 140, 141, 146, 147, 316; 370/203, 370/343, 208, 335, 344, 442
See application file for complete search history.

(56) References Cited

U.S. PATENT DOCUMENTS 6,377,636 B1* 4/2002 Paulraj et al. ............... 375/346

| 6,404,783 | B1* | 6/2002 | Cimini et al. ........... 370/525 |
| 7,242,720 | B2* | 7/2007 | Sugiyama et al. ....... 375/260 |
| 2001/0028637 | A1* | 10/2001 | Abeta et al. ............. 370/335 |
| 2004/0001563 | A1* | 1/2004 | Scarpa ..................... 375/326 |
| 2004/0008614 | A1* | 1/2004 | Matsuoka et al. ....... 370/203 |

(Continued)

FOREIGN PATENT DOCUMENTS

JP 2001-268048 9/2001

(Continued)

OTHER PUBLICATIONS

Abbas Yongacoglu and Mohamed Siala, "Space-Time Codes For Fading Channels", 1999 IEEE, pp. 2495-2499.

(Continued)

*Primary Examiner*—Mohammed Ghayour
*Assistant Examiner*—Vineeta Panwalkar
(74) *Attorney, Agent, or Firm*—The Farrell Law Firm, PC

(57) ABSTRACT

An apparatus and method for performing channel estimation in an OFDM (Orthogonal Frequency Division Multiplexing) system using multiple antennas, and a method for performing channel estimation using received sub-carriers in an OFDM system for receiving a sub-carrier having a training symbol and another sub-carrier having no training symbol comprising the steps of: a) differently setting a weight associated with a reliability of the sub-carrier having the training symbol and a weight associated with a reliability of the sub-carrier having no training symbol, b) measuring channel estimation errors associated with individual received sub-carriers, and c) performing channel estimation using the measured channel estimation errors and the set weights.

10 Claims, 7 Drawing Sheets

U.S. PATENT DOCUMENTS

2004/0047284 A1* 3/2004 Eidson .................. 370/203

FOREIGN PATENT DOCUMENTS

| JP | 2002-118534 | 4/2002 |
| JP | 2002-374224 | 12/2002 |
| WO | WO 01/07192 | 2/2001 |
| WO | WO 01/71928 | 9/2001 |

OTHER PUBLICATIONS

Vahid Tarokh, et al., "Space-Time Codes for High Data Rate Wireless Communication: Performance Criterion and Code Construction", IEEE Transactions on Information Theory, vol. 44, No. 2, Mar. 1998, pp. 744-765.

Welly Firmanto, et al., "Space-Time TCM with Improved Performance on Fast Fading Channels", IEEE Communication Letters, vol. 5, No. 4, Apr. 2001, pp. 154-156.

* cited by examiner

ANTENNA3

ANTENNA4

APPARATUS AND METHOD FOR PERFORMING CHANNEL ESTIMATION IN AN ORTHOGONAL FREQUENCY DIVISION MULTIPLEXING (OFDM) SYSTEM USING MULTIPLE ANTENNAS

PRIORITY

This application claims priority to an application entitled "APPARATUS AND METHOD FOR PERFORMING CHANNEL ESTIMATION IN ORTHOGONAL FREQUENCY DIVISION MULTIPLEXING (OFDM) SYSTEM USING MULTIPLE ANTENNAS", filed in the Korean Intellectual Property Office on May 2, 2003 and assigned Serial No. 2003-28275, the contents of which are hereby incorporated by reference.

BACKGROUND OF THE INVENTION

1. Field of the Invention

The present invention relates generally to a mobile communication system for transmitting data using a plurality of transmission/reception antennas, and more particularly to an apparatus and method for accurately performing channel estimation at a plurality of reception antennas.

2. Description of the Related Art

Signals transmitted over a wireless channel are affected by a multi-path interference caused by various obstacles existing between a transmitter and a receiver. A wireless channel having multiple paths has a maximum delay spreading characteristic and a maximum signal transmission period characteristic. If the signal transmission period is longer than the maximum delay spreading time, there is no interference between successive signals, and a frequency area characteristic of a channel is set to a frequency nonselective fading. However, in a high-speed transmission system for transmitting data using a wideband signal, the signal transmission period is shorter than the maximum delay spreading time, such that signal interference between successive signals, and thus a received signal, is affected by intersymbol interference. In this case, the frequency area characteristic of the channel is set to a frequency selective fading. A single-carrier transmission method using a coherent modulation scheme utilizes an equalizer to remove such intersymbol interference. The higher the data transmission speed, the greater the signal distortion caused by the intersymbol interference. The greater the signal distortion, the higher the equalizer's complexity. An OFDM (Orthogonal Frequency Division Multiplexing) system has been recently proposed to solve the aforementioned problem of the equalizer for use in the single-carrier transmission method.

Typically, an OFDM scheme is defined as a two-dimensional access scheme for combining a TDM (Time Division Access) technique with an FDM (Frequency Division Access) technique. Therefore, when transmitting data using the OFDM scheme, individual OFDM symbols are separately loaded on sub-carriers, and are thus transmitted over predetermined sub-channels.

The OFDM scheme has superior spectrum efficiency because sub-channel spectrums are orthogonal to each other while being overlapped with each other. The OFDM scheme enables a modulation/demodulation unit to be implemented with an effective digital configuration because an OFDM modulation/demodulation is implemented with an IFFT (Inverse Fast Fourier Transform) and a FFT (Fast Fourier Transform). Further, the OFDM scheme is very well adapted to a current Europe digital broadcasting transmission and a high-speed data transmission prescribed in a high-capacity wireless communication system standard, for example, an IEEE 802.11a, an IEEE 802.16a, or an IEEE 802.16b, etc.

The OFDM scheme, serving as an MCM (Multi-Carrier Modulation), converts a serially-entered symbol stream into a parallel symbol stream, modulates the parallel symbol stream into a plurality of sub-carriers orthogonal to each other, and transmits the plurality of sub-carriers.

Such an MCM system was first applied to a high-frequency wireless communication for use in the military in the late 1950s, and an OFDM scheme for overlapping between a plurality of orthogonal sub-carriers was first studied in the late 1970s. This OFDM scheme must implement an orthogonal modulation between multiple carriers, resulting in limited system application. However, it was known that a modulation/demodulation based on the OFDM scheme can be effectively processed using a DFT (Discrete Fourier Transform), and many developers have conducted intensive research into the OFDM scheme. Using a guard interval and a method for inserting a cyclic prefix guard interval are well known to those skilled in the art, such that negative influence on a system affected by a multiple-path and a delay spread is greatly reduced. Therefore, the OFDM scheme is widely applied to digital transmission technology, for example, DAB (Digital Audio Broadcasting), digital TV, a W-LAN (Wireless-Local Area Network), and a W-ATM (Wireless Asynchronous Transfer Mode). More specifically, although the use of the OFDM scheme has been limited due to its hardware complexity, the OFDM scheme can be implemented with digital signal processing technology such as a FFT and an IFFT. The OFDM scheme is similar to a conventional FDM (Frequency Division Multiplexing) scheme, but it can obtain optimum transmission efficiency during high-speed data transmission because it transmits a plurality of sub-carriers orthogonal to each other. Further, the OFDM scheme has superior frequency use efficiency and is very resistive to a multi-path fading, which results in an optimum transmission efficiency during high-speed data transmission. Particularly, because the OFDM scheme uses an overlapped frequency spectrum, it can effectively use a frequency, is very resistive to a frequency selective fading and a multi-path fading, reduces an intersymbol interference using a guard interval, and provides an equalizer composed of simple hardware. Also, the OFDM scheme is very resistive to an impulse noise, such that it is widely used in communication system architecture.

FIG. 1 is a block diagram of a conventional mobile communication system based on an OFDM scheme. Referring to FIG. 1, an input bit, which is a binary signal, is applied to a channel encoder 100. The channel encoder 100 codes input bits, and outputs coded symbols. The coded symbols are applied to a S/P (Serial/Parallel) converter 105. The S/P converter 105 converts received serial-coded symbols into parallel-coded symbols, and transmits the parallel-coded symbols to a modulator 110. The modulator 110 maps the received coded symbols with a symbol-mapping constellation, and outputs mapped symbols. There are a variety of modulation schemes for use in the modulator 110, for example, a QPSK, a 8PSK, a 16QAM, a 64QAM, etc. The number of bits contained in the symbols is prescribed according to individual modulation schemes. The QPSK modulation scheme is composed of 2 bits, the 8PSK modulation scheme is composed of 3 bits, the 16QAM modulation scheme is composed of 4 bits, and the 64QAM modulation scheme is composed of 6 bits. Modulated symbols generated from the modulator 110 are applied to an IFFT unit 115. The IFFT-modulated symbols generated from the IFFT unit 115 are applied to a P/S (Parallel/Serial) converter 120, and the P/S converter 120 outputs serial-format symbols. The serial-format symbols are transmitted over a transmission antenna 125.

The symbols transmitted from the transmission antenna 125 are received at a reception antenna 130. Symbols received at the reception antenna 130 are converted into parallel-format symbols over the S/P converter 135. The parallel-format symbols are transmitted to a FFT unit 140. A reception signal received at the FFT unit 130 performs an FFT process, and is then applied to a demodulator 145. The demodulator 145 has a symbol mapping constellation to the same as that of the modulator 110, and converts despreading symbols into binary-bit symbols according to the symbol mapping constellation. That is, the demodulation scheme is determined by the modulation scheme. Binary symbols demodulated by the demodulator 145 are used for channel estimation by a channel estimator 150. The channel estimator 150 estimates various conditions created when the transmission antenna 125 transmits data, resulting in an effective data reception. The binary symbols for performing channel estimation using the channel estimator 150 are converted into serial-format symbols over the P/S converter 155, and are then decoded by a decoder 160. The binary symbols applied to the channel decoder 160 are decoded and thus binary bits are generated from the channel decoder 160.

FIG. 2 is a block diagram of a mobile communication system for transmitting/receiving data according to an OFDM scheme using a plurality of transmission/reception antennas. However, prior to describing the above mobile communication system, a mobile communication system for transmitting/receiving data using one transmission/reception antenna will hereinafter be described in more detail.

$$y(n)=x(n)h(n)+n(n) \quad \text{[Equation 1]}$$

With reference to the Equation 1, y(n) is data received at a time "N" over a reception antenna, x(n) is data transmitted at a time "N" over a transmission antenna, h(n) is an index of a transmission channel environment influence of data generated from the transmission antenna at a specific time "N", and n(n) is a noise created at the time "N". The influence of the noise will herein be omitted for the convenience of description of the present invention.

As shown in the Equation 1, a reception end must previously know the value of h(n) to obtain correct data. For this purpose, a transmission/reception end of a mobile communication system transmits previously-known data in such a way that the value of h(n) can be recognized. This previously-known data is called a training symbol. Provided that the value of h(n) is recognized, a reception end of the mobile communication system can correctly recognize data transmitted from the transmission end.

As illustrated in FIG. 2, each of a plurality of transmission antennas 220, 222, and 224 transmits data using a plurality of sub-carriers having a specific frequency. The plurality of sub-carriers are assigned to the plurality of transmission antennas 220, 222, and 224 in the OFDM-based mobile communication system using a plurality of transmission/reception antennas.

Modulators 200, 202, and 204 modulate received symbols, and transmit the modulated symbols to the IFFT units 210, 212, and 214. The IFFT units 210, 212, and 214 IFFT-modulate the received symbols, and transmit IFFT-modulated symbols over individual transmission antennas 220, 222, and 224. Data transmitted over the transmission antennas 220, 222, and 224 is received at reception antennas 230, 232, and 234. The data received at the reception antennas 230, 232 and 234 is FFT-modulated at FFT units 240, 242, and 244, and is then transmitted to demodulators 250, 252, and 254. Channel estimators 260, 262, and 264 perform channel estimation on symbols demodulated at the demodulators 250, 252, and 254.

Individual reception antennas 230, 232, and 234 receive data transmitted from each of the transmission antennas 220, 222, and 224. In more detail, the reception antenna 230 receives data transmitted from the transmission antennas 220, 222, and 224, the reception antenna 232 receives data transmitted from the transmission antennas 220, 222, and 224, and the reception antenna 234 receives data transmitted from the transmission antennas 220, 222, and 224.

Individual sub-carriers having a specific frequency allocated to the transmission antennas are allocated to different transmission antennas. If the number of allocatable sub-carriers is "A" and the number of transmission antennas is "B"; an A/B number of sub-carriers is generally allocated to one transmission antenna for transmission of the training symbol.

$$x^p(n)=[0 \ldots 0x_1^p x_2^p \ldots x_{N_a}^p 0 x_{N_a+1}^p \ldots x_{2N_a}^p 0 \ldots 0]^T \quad \text{[Equation 2]}$$

Sub-carriers allocated to an OFDM-based mobile communication system are represented in the Equation 2. With reference to the Equation 2, $x^p(n)$ is a training symbol transmitted at a N-th time from a P-th antenna in the OFDM-based system having K carriers. The training symbol is a symbol recognized at a transmission/reception end of the system to perform channel estimation, is loaded on a sub-carrier having a specific frequency, and is then transmitted. As shown in the Equation 2, all the sub-carriers are not allocatable, but only some sub-carriers from among all sub-carriers are allocatable. A center carrier and both-ends carriers having a DC component are not allocated to the transmission antennas 220, 222, and 224. Therefore, the number of sub-carriers allocatable to the training symbol is $2N_a$. Provided that the number of transmission antennas is $N_t$, sub-carriers for transmission of $N_c$ training symbols are allocated to one transmission antenna.

$$2N_a=N_c N_t \quad \text{[Equation 3]}$$

Therefore, training symbols are allocated to individual transmission antennas, and the allocated training symbols are transmitted over sub-carriers.

$$x_i^p = \begin{cases} c_i & i=(m-1)N_t+p \\ 0 & \text{otherwise} \end{cases} \quad \text{[Equation 4]}$$

$$0 \le p \le N_t - 1, \ 1 \le i \le N_c N_t$$

where $x_i^p$ is a training symbol included in the $p^{th}$ training symbol group, $N_t$ is the number of antennas or the number of training symbol groups, $c_i$ is an arbitrary complex of a magnitude $\infty \sqrt{N_t}$, m is an integer lower than $N_c$, and $N_c$ is number of training symbols allocated to one transmission antenna.

When three transmission antennas are applied to the Equation 4, FIG. 3 is a view illustrating training symbols transmitted over these three transmission antennas. Referring to FIG. 3, individual transmission antennas do not transmit data in a virtual carrier area and a DC carrier area. Individual transmission antennas load the training symbols on the sub-carriers of a specific frequency according to the Equation 4, and then transmit the training symbols loaded on the sub-carriers. If the number of the training symbols having a specific frequency is 12, a first transmission antenna transmits a first training symbol, a fourth training symbol, a seventh training symbol, and a tenth-training symbol. A second transmission antenna transmits a second training symbol, a fifth training symbol, an eighth training symbol, and an eleventh training symbol. A third transmission antenna transmits a third training symbol, a sixth training symbol, a ninth training symbol, and a 12-th training symbol. A group of the training symbols transmitted at a specific time over individual transmission antennas is called a training symbol group. The training symbol group is applied to individual modulators illustrated in FIG. 2, but it will hereinafter be described in connection with a transmission antenna.

The training symbols transmitted over several transmission antennas are received at a plurality of reception antennas over individual transmission paths (i.e., channels). Individual reception antennas receive training symbols received from the transmission antennas. Therefore, one reception antenna must estimate status information of a channel for transmitting the training symbols over the transmission antennas.

TABLE 1

|                     | Transmission antenna 1 | Transmission antenna 2 | Transmission antenna 3 | Transmission antenna N |
|---------------------|------------------------|------------------------|------------------------|------------------------|
| Reception antenna 1 | h11                    | h21                    | h31                    | hN1                    |
| Reception antenna 2 | h12                    | h22                    | h32                    | hN2                    |
| Reception antenna 3 | h13                    | h23                    | h33                    | hN3                    |
| Reception antenna M | h1M                    | h2M                    | h3M                    | hNM                    |

Table 1 indicates channel estimation values to be measured at individual reception antennas for receiving training symbols from transmission antennas. The value of h11 is a channel estimation value measured at a reception antenna 1 using a training symbol received from the transmission antenna 1. The value of hNM is a channel estimation value measured at a reception antenna M using a training symbol received from the transmission antenna N. Various values created at specific time points are shown in the Table 1. The channel estimation values may be denoted by a two-dimensional matrix. The channel estimation values denoted by such a two-dimensional matrix at a specific time are called a spatial channel matrix. As shown in the Table 1, one reception antenna must measure channel estimation values associated with a plurality of transmission antennas. The channel estimation values measured by a specific reception antenna measure the training symbols several times to reduce the influence of noises. In this case, individual transmission antennas transmit a training symbol group composed of the same training symbols to the reception antennas.

TABLE 2

|    | Transmission antenna 1 | Transmission antenna 2 | Transmission antenna 3 | Transmission antenna N |
|----|------------------------|------------------------|------------------------|------------------------|
| T1 | Training symbol group 1 | Training symbol group 2 | Training symbol group 3 | Training symbol group N |
| T2 | Training symbol group 1 | Training symbol group 2 | Training symbol group 3 | Training symbol group N |
| T3 | Training symbol group 1 | Training symbol group 2 | Training symbol group 3 | Training symbol group N |
| T4 | Training symbol group 1 | Training symbol group 2 | Training symbol group 3 | Training symbol group N |

With reference to the Table 2 above, the specific transmission antenna transmits the same training symbol group to the reception antennas to measure channel estimation values. It should be noted that the training symbol group is not one training symbol, but is composed of a plurality of training symbols having a specific frequency according to Equation 4.

Individual reception antennas receive training symbol groups transmitted from transmission antennas, and perform channel estimation on the basis of the values of the received training symbols. The reception antennas repeatedly perform the channel estimation. A channel estimation value correctly measured at the reception antennas is obtained from only a specific-frequency carrier having a training symbol loaded from the transmission antennas. Other channel estimation values of sub-carriers associated with a specific frequency unloaded from the transmission antenna cannot be recognized at the reception antennas.

In a system having three transmission antennas and 12 sub-carriers, a first transmission antenna from among the three transmission antennas loads a training symbol on a first sub-carrier, a fourth sub-carrier, a seventh sub-carrier, and a tenth sub-carrier. The reception antenna receives the first sub-carrier, the fourth sub-carrier, the seventh sub-carrier, and the tenth sub-carrier from the first transmission antenna, and measures channel estimation values of individual channel paths using the received sub-carriers. However, it is impossible for the reception antenna to perform channel estimation on a second sub-carrier, a third sub-carrier, a fifth sub-carrier, a sixth sub-carrier, an eighth sub-carrier, a ninth sub-carrier, an 11-th sub-carrier, and a 12-th sub-carrier.

In order to solve this problem, recently an interpolation method for estimating channels of sub-carriers having no training symbol using channel estimation values of other sub-carriers having training symbols has been proposed. However, in this case, a training symbol is not allocated to an edge sub-carrier area, which results in an ineffective interpolation method and an increased channel estimation error. FIGS. 4A~4B illustrate channel estimation results using a conventional interpolation method. Referring to FIGS. 4A~4B, training symbols are transmitted over four transmission antennas, and channel estimation error increases at both-edge sub-carrier areas. Therefore, a need exists for a method for performing accurate channel estimation even in a sub-carrier area having no training symbol.

SUMMARY OF THE INVENTION

Therefore, the present invention has been designed in view of the above problems, and it is an object of the present invention to provide an apparatus and method for performing accurate channel estimation even in a sub-carrier area having no training symbol.

It is another object of the present invention to provide an apparatus and method for performing accurate channel estimation by assigning different weights to individual sub-carriers according to their reliabilities.

It is yet another object of the present invention to provide an apparatus and method for accurately receiving data transmitted from a transmission end by minimizing a channel estimation error.

In accordance with one aspect of the present invention, the above and other objects are accomplished by a method for grouping a plurality of training symbols into a plurality of training symbol groups to perform channel estimation corresponding to at least two transmission antennas, loading individual training symbols contained in the training symbol groups on sub-carriers, and transmitting the training symbols loaded on the sub-carriers in an OFDM (Orthogonal Frequency Division Multiplexing) system for transmitting data using the at least two transmission antennas, comprising the steps of: a) receiving the plurality of training symbol groups; and b) transmitting the received training symbol groups only once using one transmission antenna from among the of the at least two transmission antennas at intervals of a predetermined time.

In accordance with another aspect of the present invention, there is provided a method for performing channel estimation using received sub-carriers in an OFDM (Orthogonal Frequency Division Multiplexing) system for receiving a sub-carrier having a training symbol and other sub-carriers having no training symbol, comprising the steps of: a) differently setting a weight associated with a reliability of the sub-carrier having the training symbol and a weight associated with a reliability of the sub-carrier having no training symbol; b) measuring channel estimation errors associated with individual received sub-carriers; and c) performing channel estimation using the measured channel estimation errors and the set weights.

In accordance with yet another aspect of the present invention, there is provided an apparatus for grouping a plurality of training symbols into a plurality of training symbol groups to perform channel estimation corresponding to at least two transmission antennas, loading individual training symbols contained in the training symbol groups on sub-carriers, and transmitting the training symbols loaded on the sub-carriers in an OFDM (Orthogonal Frequency Division Multiplexing) system for transmitting data using the at least two transmission antennas, comprising: a distributor for distributing the training symbol groups only once, using one transmission antenna from among the at least two transmission antennas at intervals of a predetermined time; and of the at least two transmission antennas for transmitting the training symbol groups received from the distributor.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
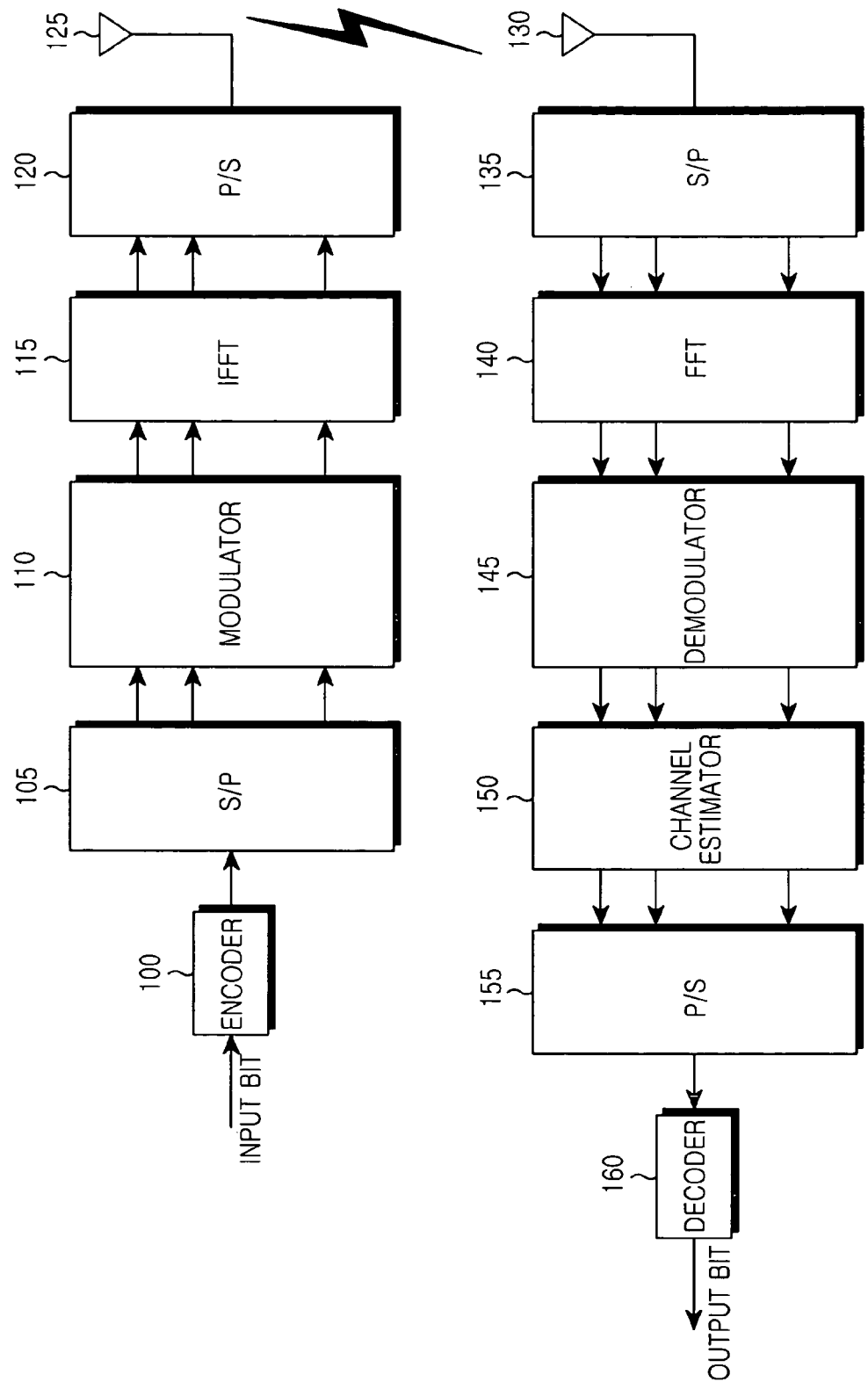
FIG. 1 is a block diagram of a conventional mobile communication system based on an OFDM scheme.
Figure 2:
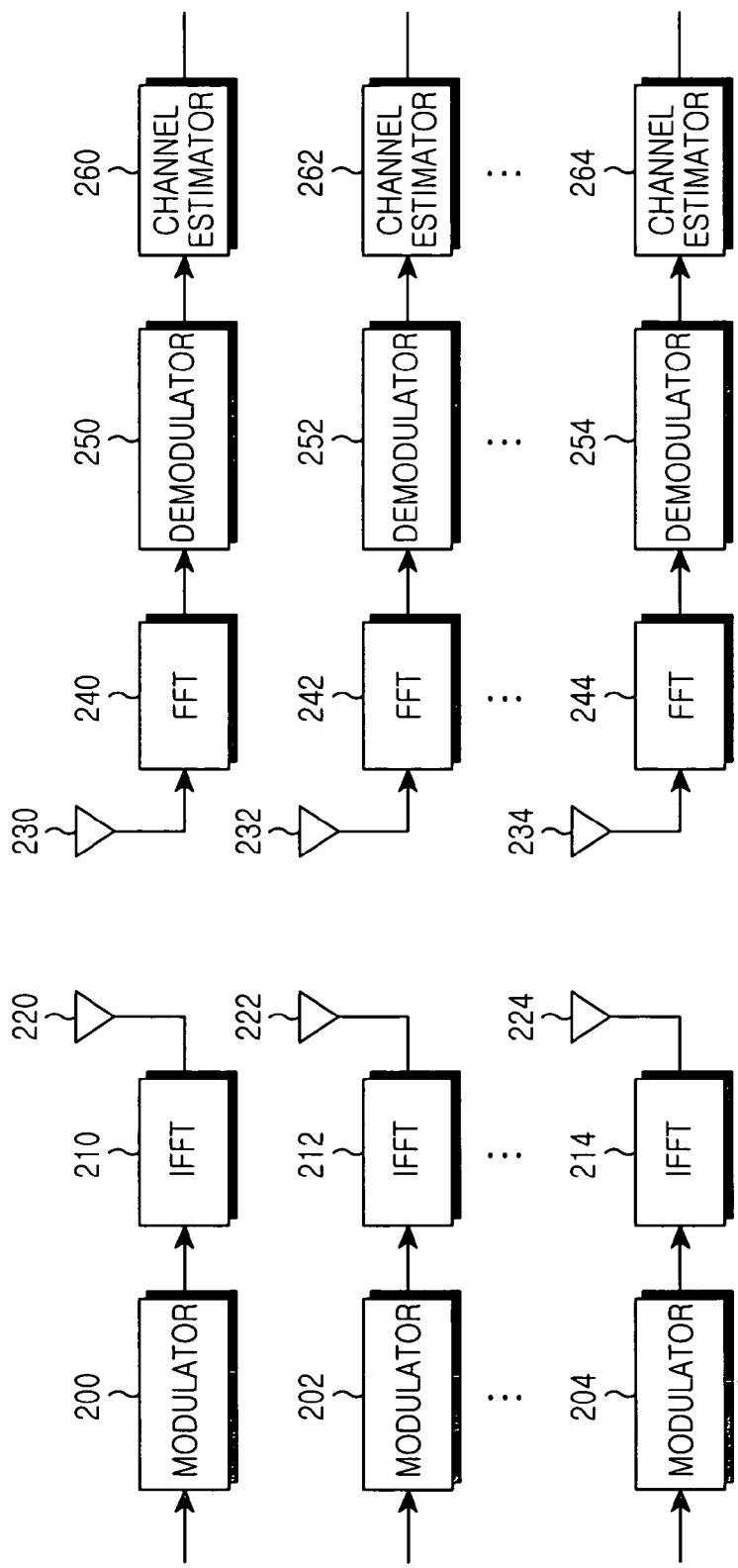
FIG. 2 is a block diagram of a mobile communication system based on an OFDM scheme using a plurality of transmission/reception antennas.
Figure 3:
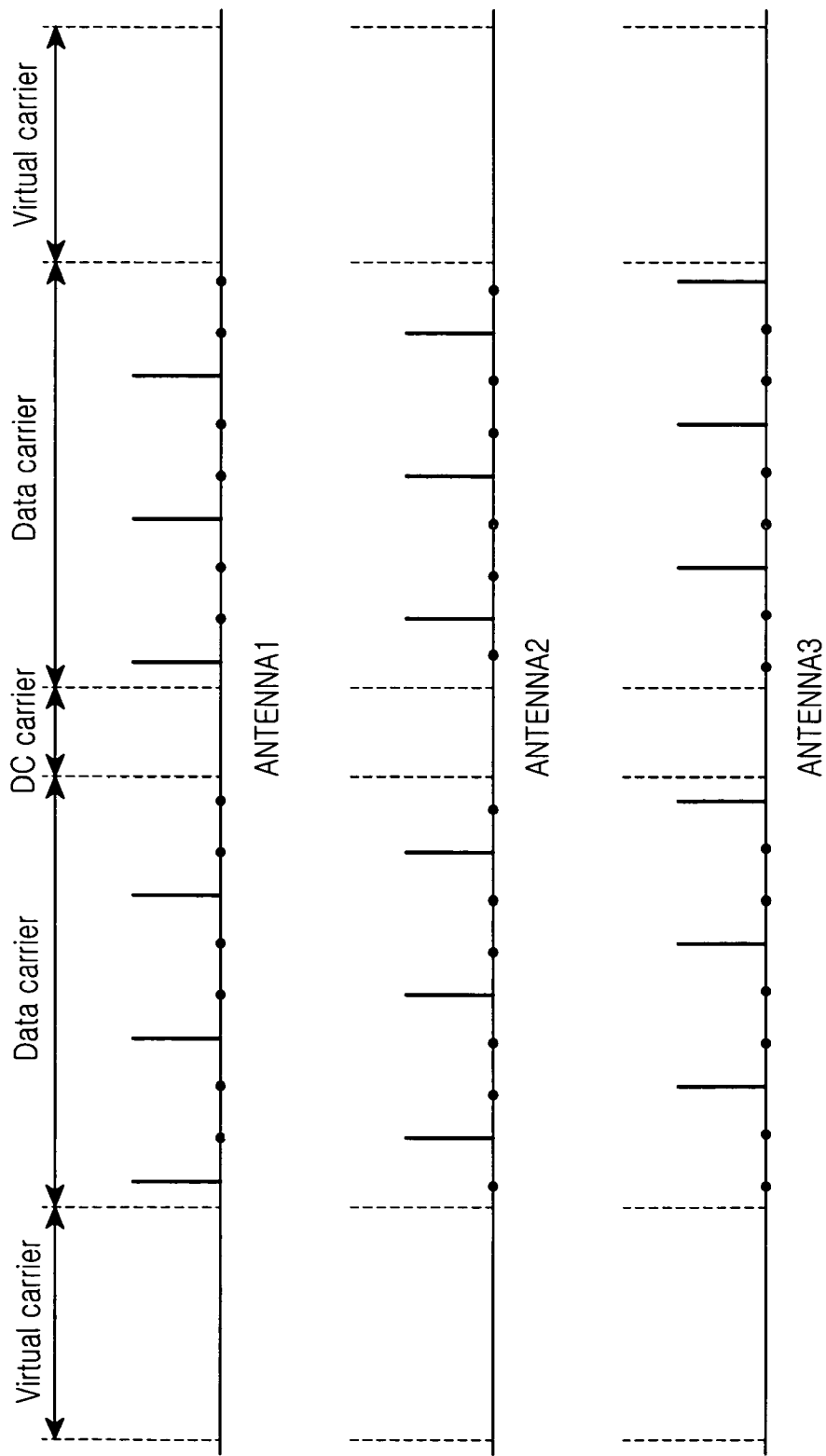
FIG. 3 is a view illustrating training symbols transmitted over three transmission antennas.
Figure 4A:
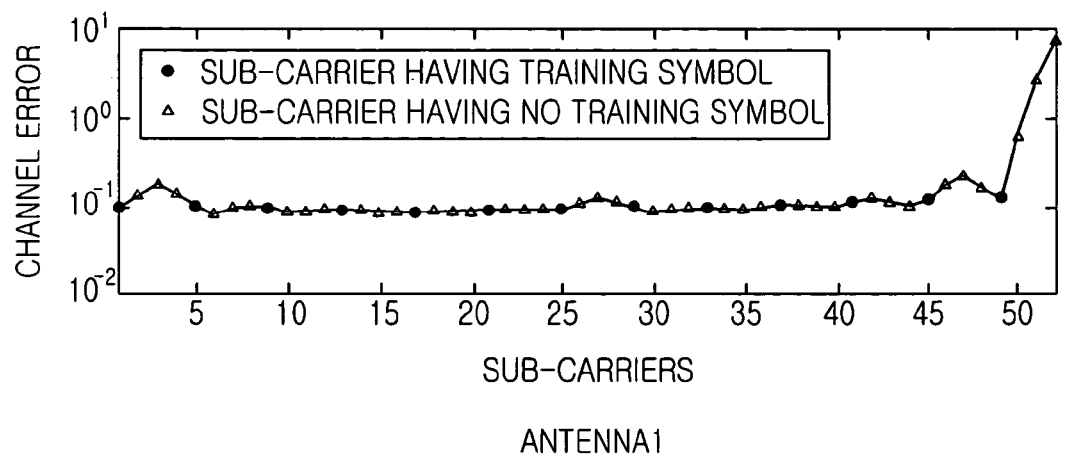
FIG. 4A illustrates a channel estimation error of a sub-carrier area where a training symbol is not received from first and second transmission antennas from among four transmission antennas.
Figure 4A:
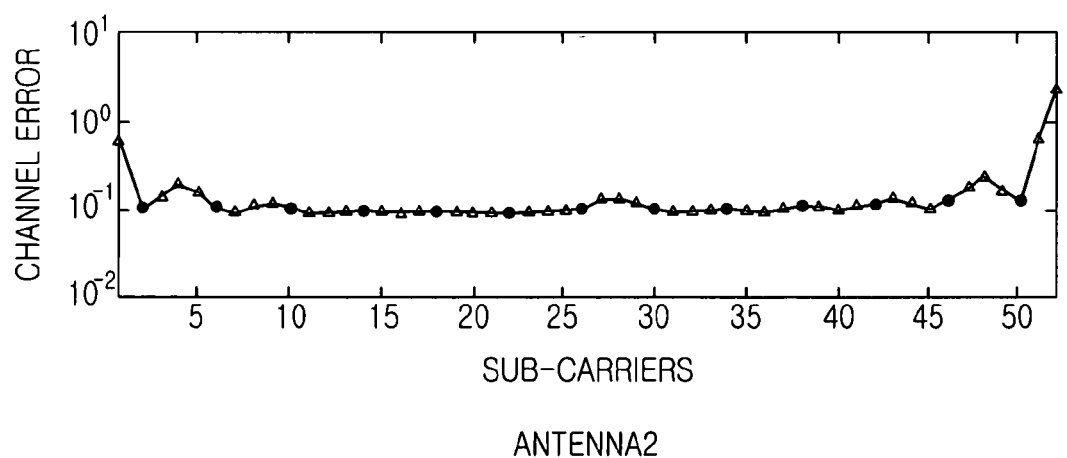
Figure 4B:
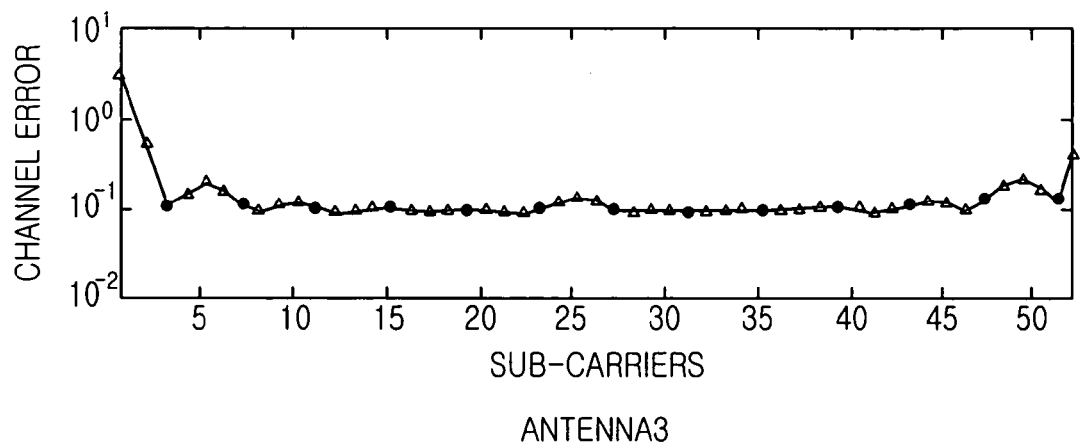
FIG. 4B illustrates a channel estimation error of a sub-carrier area where a training symbol is not received from third and fourth transmission antennas from among four transmission antennas.
Figure 4B:
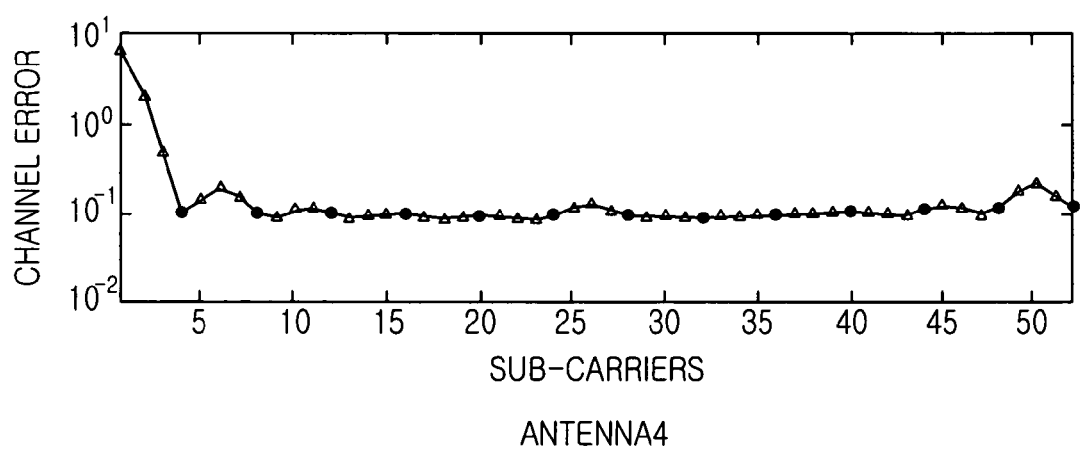

Preferred embodiments of the present invention will be described in detail herein below with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 5:
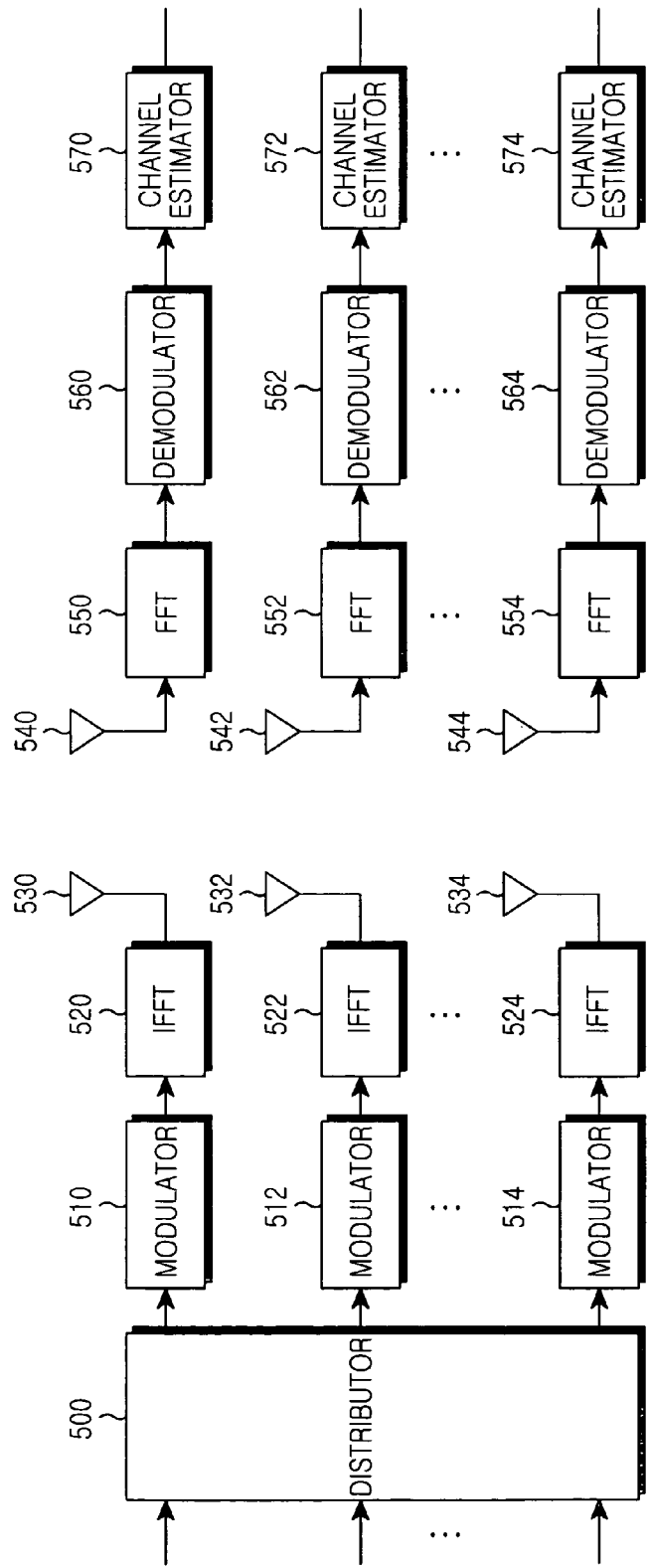
FIG. 5 is a block diagram of a mobile communication system based on an OFDM scheme using a plurality of transmission/reception antennas in accordance with a preferred embodiment of the present invention.

FIG. 5 is a block diagram of a mobile communication system based on an OFDM scheme using a plurality of transmission/reception antennas in accordance with a preferred embodiment of the present invention. Referring to FIG. 5, a transmission end includes a distributor 500, a plurality of modulators 510, 512, and 514, a plurality of IFFT units 520, 522, and 524, and a plurality of transmission antennas 530, 532, and 534. A reception end includes a plurality of reception antennas 540, 542, and 544, a plurality of FFT units 550, 552, and 554, a plurality of demodulators 560, 562, and 564, and a plurality of channel estimators 570, 572, and 574. Although the number of the channel estimators illustrated in FIG. 5 is equal to the number of demodulators, one channel estimator can perform channel estimation associated with all channels. However, for the convenience of this description and better understanding of the present invention, it is assumed that the present invention includes a plurality of channel estimators.

A plurality of training symbol groups are applied to the distributor 500. The number of training symbol groups is equal to the number of transmission antennas. Herein below, the training symbol groups will be first described and then a function of the distributor will be described in detail.

It is assumed that the number of sub-carriers for use in a mobile communication system based on an OFDM scheme shown in Equation 2 is "K", and the number of sub-carriers, which are actually allocatable to a system, from among K sub-carriers is $N_a$. Assuming that the number of transmission antennas is $N_t$, the number of sub-carriers for transmitting the training symbol over only one transmission antenna is $N_c$. The sub-carriers allocated to only one transmission antenna are sequentially allocated to a plurality of transmission antennas one by one, instead of allocation of successive sub-carriers. Such sub-carriers for transmitting training symbols allocated to transmission antennas will hereinafter be described in detail. Equation 4 describes the magnitude of the training symbols, but the following description relates to only the fact that the training symbols exist, for convenience of description and better understanding of the present invention. If the training symbol has a specific magnitude, a predetermined value of 1 is used in the present invention. If the training symbol has no specific magnitude, a predetermined value of 0 is used in the present invention.

Provided that the number of transmission antennas is 4 and the number of allocatable sub-carriers is 64 (i.e., a sub-carrier 1 through a sub-carrier 64), four training symbol groups are created, and each of the four training symbol groups is composed of 16 training symbols.

Training symbol group 1: Sub-carrier Number=4a+1 ($0 \leq a \leq 15$);

Training symbol group 2: Sub-carrier Number=4a+2 ($0 \leq a \leq 15$);

Training symbol group 3: Sub-carrier Number=4a+3 ($0 \leq a \leq 15$); and

Training symbol group 4: Sub-carrier Number=4a+4 ($0 \leq a \leq 15$).

The above training symbol groups are applied to the distributor 500. The distributor 500 sequentially transmits received specific training symbol groups to a plurality of modulators 510, 512, and 514 in predetermined transmission time units. In this case, the distributor 500 stores the received training symbol groups, and sequentially transmits the stored training symbol groups to the plurality of modulators 510, 512, and 514 in predetermined transmission time units. Further, the distributor 500 receives the training symbol groups in predetermined transmission time units, and transmits the received training symbol groups to the plurality of modulators 510, 512, and 514. In this case, the distributor 500 transmits training symbol groups other than a previously-transmitted training symbol group to a specific modulator. Table 3 below shows training symbol groups transmitted to the plurality of modulators 510, 512, and 514 in predetermined transmission time units through the use of the distributor 500.

TABLE 3

| | Modulator 1 | Modulator 2 | Modulator 3 | Modulator 4 |
|---|---|---|---|---|
| T1 | Training symbol group 1 | Training symbol group 2 | Training symbol group 3 | Training symbol group 4 |
| T2 | Training symbol group 2 | Training symbol group 3 | Training symbol group 4 | Training symbol group 1 |
| T3 | Training symbol group 3 | Training symbol group 4 | Training symbol group 1 | Training symbol group 2 |
| T4 | Training symbol group 4 | Training symbol group 1 | Training symbol group 2 | Training symbol group 3 |

With reference to the above Table 3, the modulator 1 transmits the training symbol group 1 at a transmission time T1, and transmits the training symbol group 2 at a transmission time T2. The modulator 1 transmits the training symbol group 3 at a transmission time T3, and transmits the training symbol 4 at a transmission time T4. The distributor transmits each of the training symbol groups received by four transmissions to a specific modulator.

The modulators 510, 512, and 514 modulate received training symbols, and transmit the modulated training symbols to the IFFT units 520, 522, and 524. The IFFT units 520, 522, and 524 perform IFFT modulation on the received symbols, and transmit the IFFT-modulated symbols to individual transmission antennas 530, 532, and 534.

The data received at the reception antennas 540, 542, and 544 is FFT-modulated at FFT units 550, 552, and 554, and is then transmitted to demodulators 560, 562, and 564. Channel estimators 570, 572, and 574 perform channel estimation on symbols demodulated at the demodulators 560, 562, and 564.

As stated above, the present invention transmits all the training symbols to individual transmission antennas, resulting in reduction of a channel estimation error created in a sub-carrier area where a training symbol is not received using the interpolation method.

A channel estimation process for use in a channel estimator (570, 572, and 574) of the reception end will hereinafter be described in detail.

A specific reception antenna for receiving a plurality of training symbol groups from a specific transmission antenna includes a channel estimator. The channel estimator corresponding to the specific reception antenna must perform channel estimation associated with all channels received at the specific reception antenna. If there are four transmission antennas and symbols are transmitted over 16 channels for every transmission antenna, the channel estimator must perform channel estimation associated with 64 channels at a specific time. However, for the convenience of description, it is assumed that the channel estimator is associated with a symbol transmitted from only one transmission antenna. The channel estimator performs channel estimation using training symbol groups received several times. A channel corresponding to a specific sub-carrier is classified into a sub-carrier having a training symbol and another sub-carrier having no training symbol. If the training symbols are transmitted at specific transmission times equal to the number of the transmission antennas, the reception antenna receives a sub-carrier having one training symbol. The reception antenna receives sub-carriers having no training symbol. In this case, the number of the training symbols is less than the number of transmission antennas by one. Sub-carriers transmitted to the channel estimator do not have the same reliabilities. One sub-carrier having a training symbol has high reliability, whereas the other sub-carrier having no training symbol has low reliability. Therefore, the channel estimator allocates different weights to sub-carriers according to reliability information of the sub-carriers, and thus channel estimation must be performed using the sub-carriers having different weights.

$$X_{comb}^1(1) = X_{comb}^2(2) = X_{comb}^3(3) = \ldots = X_{comb}^{N_t}(N_t)$$ [Equation 5]

$$X_{comb}^2(1) = X_{comb}^3(2) = X_{comb}^4(3) = \ldots = X_{comb}^1(N_t)$$

$$\vdots$$

$$X_{comb}^{N_t}(1) = X_{comb}^1(2) = X_{comb}^2(3) = \ldots = X_{comb}^{N_t-1}(N_t)$$

With reference to the Equation 5, a training symbol transmitted to a first transmission antenna at a specific time is transmitted to a second transmission antenna at the next available time after the lapse of the specific time. The first transmission antenna selects one training symbol from among the remaining training symbols other than the above training symbol having been transmitted at the specific time, and transmits the selected one training symbol. Individual transmission antennas transmit the training symbols specific transmission times equal to the number of the transmission antennas. $N_t$ is the number of transmission antennas. Provided that a training symbol transmitted to a P-th transmission antenna at an arbitrary N-th time is $X_{comb}^P(n)$, the training symbol $X_{comb}^P(n)$ is received at a q-th reception antenna according to the following Equation 6.

$$y^{p,q}(n) = X_{comb}^p(n) F_{[1:L]} h_n^{p,q}(n) + w^q(n)$$ [Equation 6]

With reference to Equation 6, $X_{comb}^P(n)$ indicates reception training symbols denoted by a matrix format, $F_{[1:L]}$ indicates a K×L matrix composed of a first row to a L-th row, contained in K×K dimensional Fourier Transform matrices. As described above, K is the number of sub-carriers for use in an OFDM system, and L is a channel length. The channel length must be shorter than a predetermined length corresponding to the number of sub-carriers. $h_n^{p,q}(n)$ indicates a channel impulse response between a P-th transmission antenna and a Q-th reception antenna at a N-th time, and $w^q(n)$ indicates a noise applied to individual sub-carriers over the Q-th reception antenna. The channel impulse response $h_n^{p,q}(n)$ can be calculated by the following Equation 7.

$$\hat{h}_n^{p,q}(n) = (X_{comb}^p(n) F_{[1:L]}^p)^+ y^{p,q}(n)$$ [Equation 7]

A channel frequency response needed to perform channel equalization can be calculated by the following Equation 8.

$$\hat{h}_f^{p,q}(n) = F_{[1:L]} \hat{h}_n^{p,q}(n)$$ [Equation 8]

$$= h_f^{p,q}(n) + F_{[1:L]} (X_{comb}^p(n) F_{[1:L]})^+ w^q(n)$$

$$= h_f^{p,q}(n) + e^{p,q}(n)$$

With reference to the Equation 8, $F_{[1:L]}$ indicates a $2N_a \times L$ matrix composed of columns corresponding to usable sub-carriers, and $e^{p,q}(n)$ is a channel estimation error. A mean squared error can be calculated by the following Equation 9.

$$\sigma_{p,q}^2(n) = \psi(E\{e^{p,q}(n)e^{p,q}(n)^H\}) \quad \text{[Equation 9]}$$

With reference to the Equation 9, $\psi(\bullet)$ is an operator for creating a vector using a diagonal element of a matrix, $E(\bullet)$ is an operator for adapting a mean value, and $(\bullet)^H$ is a conjugate-transpose operator. A reception end for receiving a conventional training symbol has different mean square errors for every transmission antennas as illustrated in FIG. 4. However, according to an inventive structure for cyclically transmitting training symbol groups, a mean square error measured at one transmission antenna has different values varying with time. If such different channel estimation errors varying with time are created, the present invention must perform channel estimation considering reliability of a channel estimation error, instead of performing channel estimation by adapting a mean value of measurement channel estimation errors according to individual measurement times. Concisely, the channel estimation is performed considering reliability of channel estimation errors, thereby resulting in a reduction of a channel estimation error range. Therefore, the channel estimators multiply different weights by measurement channel estimation errors according to reliabilities of the measurement channel estimation errors, and perform channel estimation using channel estimation errors multiplied by different weights. The estimated channel frequency response can be calculated by the following Equation 10.

$$\hat{h}_f^{p,q} = \left(\sum_{n=1}^{N_t} C^{p,q}(n)\right)^{-1} \sum_{n=1}^{N_t} C^{p,q}(n)\hat{h}_f^{p,q}(n) \quad \text{[Equation 10]}$$

$$= h_f^{p,q} + \left\{\sum_{n=1}^{N_t} C^{p,q}(n)\right\}^{-1} \sum_{n=1}^{N_t} C^{p,q}(n)e^{p,q}(n)$$

$$= h_f^{p,q} + \Omega^{p,q}$$

With reference to the Equation 10, $C^{p,q}(n)$ is a matrix-format weight for minimizing a channel estimation error, and $\Omega^{p,q}$ is a channel estimation error created after such optimum multiplication. In this case, a diagonal matrix of the weights can be calculated by the Equation 11.

$$\min_{C^{p,q}} \{E\{\Omega^{p,q}\Omega^{p,q^H}\}\} \quad \text{[Equation 11]}$$

With reference to the Equation 11, $C^{p,q}(n)$ is a matrix-format weight for creating a minimum mean square error after performing such optimum multiplication, and is denoted by the following Equation 12.

$$C^{p,q}(n) = (\text{diag}(\sigma_{p,q}^2(n)))^{-1} \quad \text{[Equation 12]}$$

With reference to the Equation 12, a transmission sub-carrier having a training symbol has high reliability, such that it is assigned a high weight. A transmission sub-carrier having no training symbol has low reliability, such that it is assigned a low weight. In this way, a channel estimator for use in a mobile communication system can reduce a measurement channel estimation error.

Figure 6:
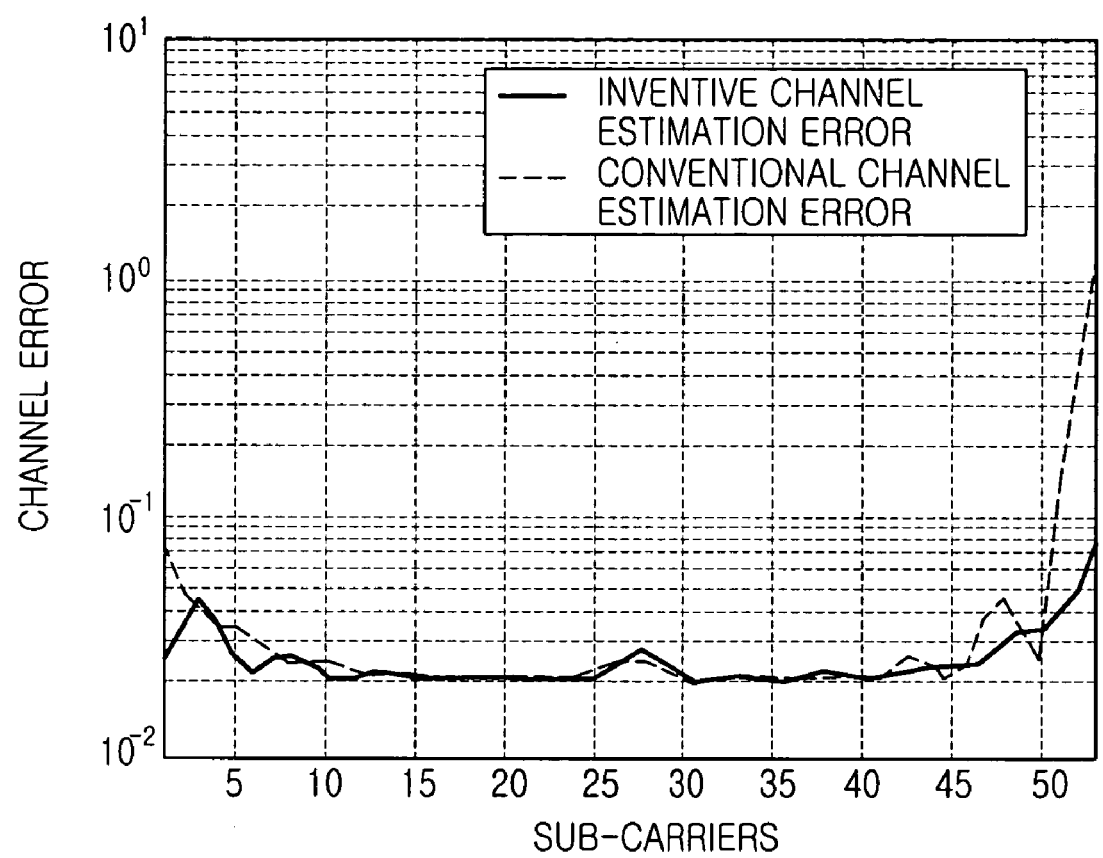
FIG. 6 is a view illustrating a difference between a channel estimation error based on the present invention and a conventional channel estimation error.

FIG. 6 illustrates a difference between a channel estimation error based on the present invention and a conventional channel estimation error. In FIG. 6, a channel estimation error associated with sub-carriers transmitted from both-ends is abruptly reduced.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transmitting in an Orthogonal Frequency Division Multiplexing (OFDM) system using a plurality of transmission antennas, the method comprising the steps of:
    creating a plurality of training symbol groups to perform channel estimation corresponding to the plurality of transmission antennas, by grouping a plurality of training symbols into the plurality of training symbol groups according to the frequency of the timing symbols; and
    transmitting each of the training symbol groups only once from each of the plurality of transmission antennas at predetermined time intervals.

2. The method of claim 1, wherein the number of the plurality of training symbol groups is equal to the number of the plurality of transmission antennas, and allocated in a non-overlapping pattern, and are simultaneously transmitted through the number of the plurality of transmission antennas.

3. The method of claim 2, wherein the plurality of training symbol groups are sequentially allocated to the plurality of transmission antennas.

4. The method of claim 1, wherein the training symbols are grouped into the plurality of training symbol groups by:

$$x_i^p = \begin{cases} c_i & i = (m-1)N_t + p \\ 0 & \text{otherwise} \end{cases}$$

$$0 \le p \le N_t - 1, \ 1 \le i \le N_c N_t$$

where $x_i^p$ is a training symbol included in the $p^{th}$ training symbol group, $N_1$, is the number of antennas or the number of training symbol groups, $c_i$ is an arbitrary complex of a magnitude $\sqrt{N_t}$, m is an integer lower than $N_c$, and $N_c$ is number of training symbols allocated to one transmission antenna.

5. The method of claim 1, wherein each of the plurality of transmission antennas transmits a specific sub-carrier equal to the number of the plurality of transmission antennas, and transmits each of the plurality of training symbol groups only once.

6. An apparatus for transmitting in an Orthogonal Frequency Division Multiplexing (OFDM) system using transmission antennas, the apparatus comprising:
    a distributor for creating a plurality of training symbol groups to perform channel estimation corresponding to the plurality of transmission antennas, by grouping a plurality of training symbols into the plurality of training symbol groups according to the frequency of the training symbols, and transmitting the plurality of training symbol groups through the plurality of transmission antennas, so that each transmission antenna from among the plurality of transmission antennas transmits all of the plurality of training symbol groups by transmitting each training symbol group only once at predetermined time intervals; and
    the plurality of transmission antennas for transmitting the training symbol groups received from the distributor.

7. The apparatus of claim 6, wherein the number of the plurality of training symbol groups is equal to the number of the plurality of transmission antennas, and wherein the distributor allocates the plurality of training symbol groups in a non-overlapping pattern, and simultaneously transmits the plurality of training symbol groups through the number of the plurality of transmission antennas.

8. The apparatus of claim 7, wherein the distributor sequentially allocates the plurality of training symbols to the plurality of transmission antennas.

9. The apparatus of claim 6, wherein the distributor groups the training symbols into the plurality of training symbol according to $$x_i^p = \begin{cases} c_i & i = (m-1)N_t + p \\ 0 & \text{otherwise} \end{cases}$$

$$0 \leq p \leq N_t - 1,\ 1 \leq i \leq N_c N_t$$

where $x_i^p$ is a training symbol included in the $P^{th}$ training symbol group, $N_t$ is the number of antennas or the number of training symbol groups, $c_i$ is an arbitrary complex of a magnitude $\sqrt{N_t}$, m is an integer lower than $N_c$, and $N_c$ is the number of training symbols allocated to one transmission antenna.

10. The apparatus of claim 6, wherein each of the plurality of transmission antennas transmits a specific sub-carrier, the number of sub-carriers being equal to a multiple of the number of the plurality of the transmission antennas, and transmits each of the plurality of training symbol groups only once.

* * * * *

UNITED STATES PATENT AND TRADEMARK OFFICE
CERTIFICATE OF CORRECTION

| | | |
|---|---|---|
| PATENT NO. | : 7,388,920 B2 | Page 1 of 1 |
| APPLICATION NO. | : 10/726118 | |
| DATED | : June 17, 2008 | |
| INVENTOR(S) | : Seung-Hoon Nam et al. | |

It is certified that error appears in the above-identified patent and that said Letters Patent is hereby corrected as shown below:

In Claim 1, in column 12, line 15, "timing" should be changed to --training--.

Signed and Sealed this
Twenty-third Day of October, 2012

David J. Kappos
*Director of the United States Patent and Trademark Office*